United States Patent
Tezuka

(10) Patent No.: US 9,519,279 B2
(45) Date of Patent: Dec. 13, 2016

(54) WAVEFORM DISPLAY DEVICE PROVIDED WITH SEARCH FUNCTION ACCORDING TO SET CONDITION

(71) Applicant: FANUC CORPORATION, Yamanashi (JP)

(72) Inventor: Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 383 days.

(21) Appl. No.: 14/189,881

(22) Filed: Feb. 25, 2014

(65) Prior Publication Data

US 2014/0244024 A1 Aug. 28, 2014

(30) Foreign Application Priority Data

Feb. 26, 2013 (JP) .................................. 2013-036075

(51) Int. Cl.
*G06F 19/00* (2011.01)
*G05B 19/18* (2006.01)
*G05B 19/4063* (2006.01)

(52) U.S. Cl.
CPC ......... *G05B 19/188* (2013.01); *G05B 19/4063* (2013.01); *G05B 2219/50197* (2013.01)

(58) Field of Classification Search
CPC combination set(s) only.
See application file for complete search history.

(56) References Cited

U.S. PATENT DOCUMENTS 5,379,239 A * 1/1995 Nakatani ............ G06F 15/0258
  345/440.1
6,981,417 B1 * 1/2006 Oravecz ............ G01N 29/0609
  73/612

(Continued)

FOREIGN PATENT DOCUMENTS

JP 2003223207 A 8/2003
JP 3575019 B 7/2004

(Continued)

OTHER PUBLICATIONS

Office Action mailed Jul. 15, 2014, corresponding to Japanese patent application No. 2013-036075.

(Continued)

*Primary Examiner* — Kidest Bahta
(74) *Attorney, Agent, or Firm* — Hauptman Ham, LLP

(57) ABSTRACT

A waveform display device displaying by a waveform a time series of physical quantity data in a machine tool having a servo motor controlled by a numerical control device, the waveform display device including: a time series data acquisition part acquiring the time series of physical quantity data; a search condition setting part setting a search condition of the physical quantity data; a data search part searching for physical quantity data satisfying the search condition set from the acquired physical quantity data; and a search result display part extracting a time series of physical quantity data in a predetermined range including the searched physical quantity data or other physical quantity data corresponding to the searched physical quantity data from the acquired physical quantity data, and displaying the extracted time series of physical quantity data by a waveform.

6 Claims, 11 Drawing Sheets

(56) References Cited

U.S. PATENT DOCUMENTS

| | | | |
|---|---|---|---|
| 7,079,797 B2* | 7/2006 | Shinohara | G03G 15/1615 399/167 |
| 2002/0196190 A1* | 12/2002 | Lim | H01Q 1/40 343/700 MS |
| 2004/0093191 A1* | 5/2004 | Jeppsson | G01N 29/12 703/1 |
| 2009/0261990 A1* | 10/2009 | Wu | G05B 19/409 341/20 |
| 2011/0015877 A1* | 1/2011 | Okita | G05B 19/409 702/41 |
| 2012/0078404 A1* | 3/2012 | Saito | G05B 19/4184 700/97 |

FOREIGN PATENT DOCUMENTS

| | | |
|---|---|---|
| JP | 2007179314 A | 7/2007 |
| JP | 2010127626 A | 6/2010 |
| JP | 2011215798 A | 10/2011 |

OTHER PUBLICATIONS

Lange, D.: Intelligentes steuerungsintegriertes Prozessüberwachungssystem. Vortrag zum Chemnitzer Produktionstechnischen Kolloquium am 6. und 7. Nov. 2001, S. 1-12.

National Instruments: Handbuch Ni DIAdem (TM), National Instruments Ireland Resources Limited, Jul. 2012, 323082K-0113.—Firmenschrift.

Office Action dated Aug. 17, 2015, corresponding to German patent application No. 102014002477.6.

* cited by examiner

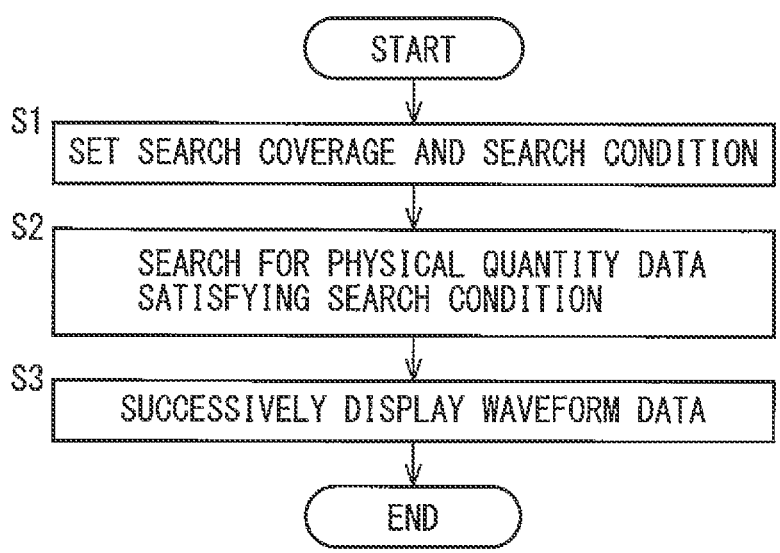

WAVEFORM DISPLAY DEVICE PROVIDED WITH SEARCH FUNCTION ACCORDING TO SET CONDITION

RELATED APPLICATIONS

The present application claims priority to Japanese Application Number 2013-036075, filed Feb. 26, 2013, the disclosure of which is hereby incorporated by reference herein in its entirety.

BACKGROUND OF THE INVENTION

1. Field of the Invention

The present invention relates to a waveform display device which searches for and displays data which matches with a set condition from among a time series of physical quantity data which changes with time.

2. Description of the Related Art

A device is known which is designed to store measurement results constituted by waveform data while setting abnormal regions of waveform data by user key operation, judging if the stored waveform data is in the abnormal regions, and, when judging that the waveform data is in the abnormal regions, displaying the waveform data in the abnormal regions in a predetermined order. This device is, for example, described in Japanese Patent Publication No. 3575019 (JP3575019B).

However, in the technique of setting abnormal regions and judging presence of abnormalities in the waveform data as in the device described in JP3575019B, it is difficult to set the abnormal regions in an optimal manner and the desired waveform data is liable to be unable to be obtained. Further, like the device described in JP3575019B, displaying waveform data which is judged for presence in the abnormal regions, a user cannot determine the relationship between the waveform data which corresponds to the abnormal regions and the other waveform data in the time regions which corresponds to the abnormal regions.

SUMMARY OF THE INVENTION

A waveform display device of one aspect of the present invention is a waveform display device displaying, by a waveform, a time series of physical quantity data changing with time in a machine tool which has a servo motor controlled by a numerical control device, the waveform display device including: a time series data acquisition part acquiring the time series of physical quantity data; a search condition setting part setting a search condition of the physical quantity data; a data search part searching for physical quantity data satisfying the search condition set by the search condition setting part, from among the physical quantity data acquired by the time series data acquisition part; and a search result display part extracting a time series of physical quantity data in a predetermined range including the physical quantity data searched by the data search part or other physical quantity data corresponding to the physical quantity data searched by the data search part, from among the physical quantity data acquired by the time series data acquisition part, and displaying the extracted time series of physical quantity data by a waveform.

BRIEF DESCRIPTION OF THE DRAWINGS

The objects, features, and advantages of the present invention will become clearer from the following description of embodiments in relation to the attached drawings.

FIG. 6 is a flowchart which shows one example of processing which is performed by the waveform display device of FIG. 1.

DETAILED DESCRIPTION

Figure 1:
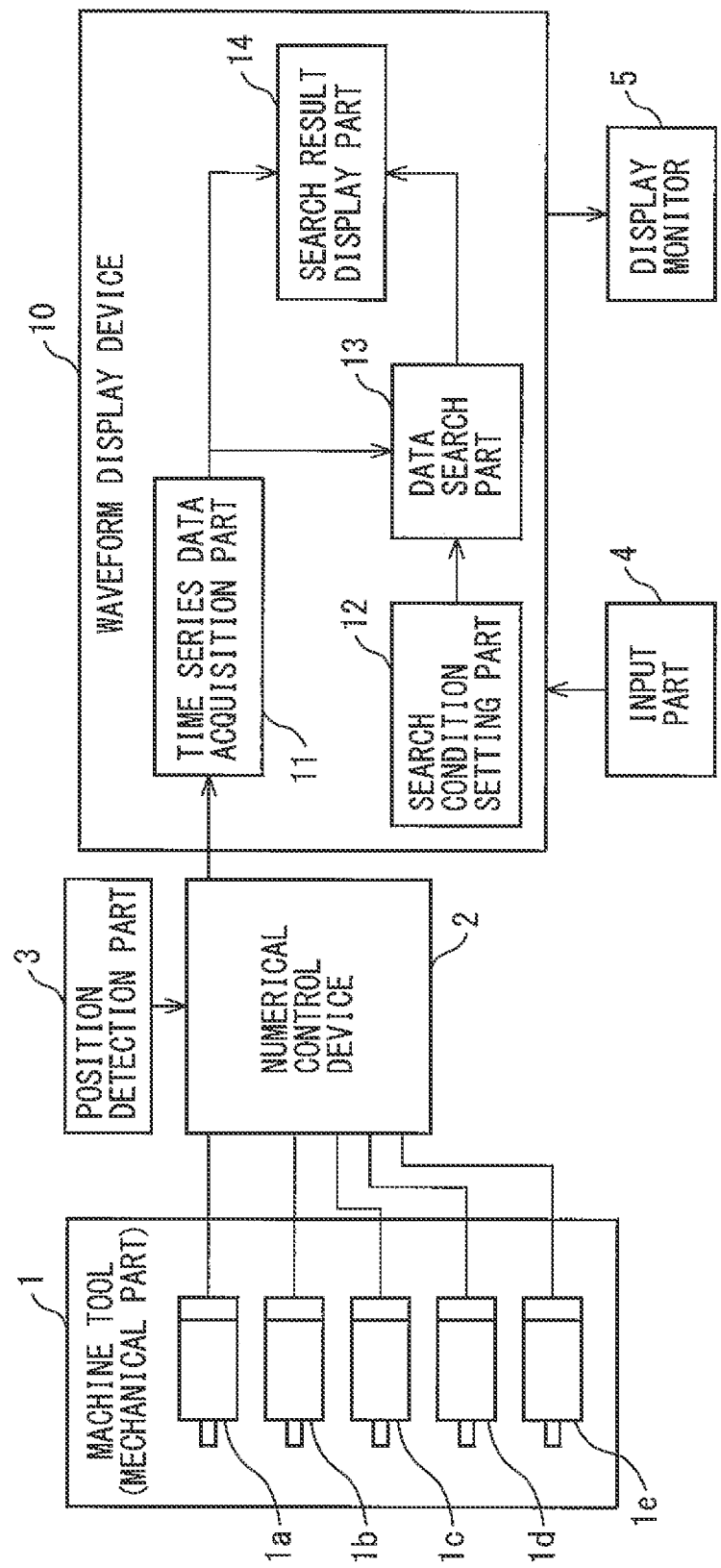
FIG. 1 is a block diagram which shows the principal configuration of a waveform display device according to an embodiment of the present invention.

Below, referring to FIG. 1 to FIG. 9D, an embodiment of the waveform display device according to the present invention will be explained. FIG. 1 is a block diagram which schematically shows the principal configuration of a waveform display device 10 according to an embodiment of the present invention. The waveform display device 10 receives a signal from a numerical control device 2 which controls a machine tool 1 and displays by a waveform a time series of the physical quantity data of the machine tool 1 which matches a predetermined condition.

Figure 2:
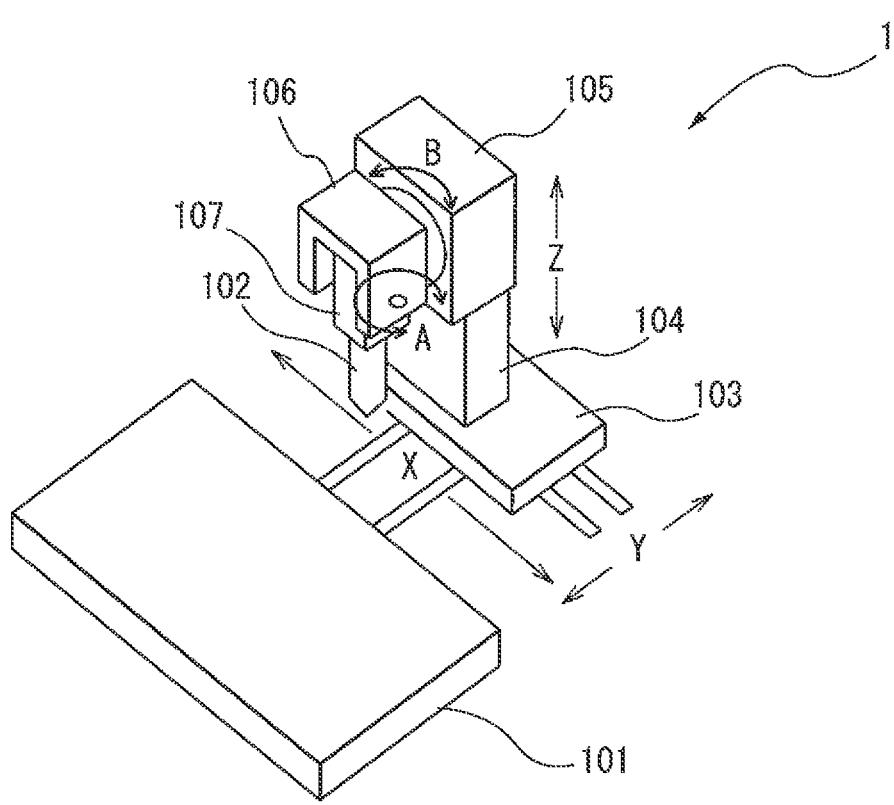
FIG. 2 is a view which shows the principal configuration of a machine tool to which a waveform display device according to an embodiment of the present invention is applied.

FIG. 2 is a view which shows the principal configuration of the machine tool 1. As shown in FIG. 2, the machine tool 1 is, for example, a five-axis vertical type machining center which is configured so that a tool 102 can move relative to a table 101 in three orthogonal axial directions (X-axial direction, Y-axial direction, and Z-axial direction) and two rotary axial directions (A-axial direction and B-axial direction). That is, the machine tool 1 has a table 101 on which a workpiece is placed, a base 103 which can move with respect to the table 101 in an X-axial direction and a Y-axial direction through linear feed mechanisms, a column 104 which is provided standing on the base, an elevator part 105 which ascends and descends with respect to the column 104 through a linear feed mechanism, a rotary part 106 which is supported at the elevator part 105 to be able to rotate in a B-axial direction centered about the Y-axis through a rotary feed mechanism, a spindle 107 which is supported at the rotary part 106 to be able to rotate in an A-axial direction centered about the X-axial direction through a rotary feed mechanism, and a tool 102 which is mounted at the spindle 107 to be able to rotate.

As shown in FIG. 1, X-axis use, Y-axis use, and Z-axis use linear feed mechanisms respectively have X-axis use, Y-axis use, and Z-axis use servo motors $1a$, $1b$, and $1c$, while the A-axis use and B-axis use rotary feed mechanisms respectively have A-axis use and B-axis use servo motors $1d$ and $1e$. The servo motors $1a$ to $1e$ are controlled in accordance with a predetermined machining program (for example, feedback controlled) by a numerical control device 2. The numerical control device 2 receives as input the signals from position detection parts 3 (linear scales etc.) which detect positions of the feed axes. The position detection parts 3 can be configured by rotary encoders which are built into the servo motors $1a$ to $1e$.

The waveform display device 10 is configured including a processing system which has a CPU, ROM, RAM, and other peripheral circuits and is functionally configured including a time series data acquisition part 11, search condition setting part 12, data search part 13, and search result display part 14. The waveform display device 10 has an input part 4 by which a user inputs various conditions and a display monitor 5 which displays various information connected to it. The input part 4 and display monitor 5 need not be independently configured. The search condition setting part 12 may include the function of the input part 4, while the search result display part 14 may include the function of the display monitor 5.

The time series data acquisition part 11 acquires the physical quantity data which is input from the position detection parts 3 to the numerical control device 2 or the physical quantity data which the numerical control device 2 itself has. The physical quantity data is, for example, the positions, speeds, accelerations, or torques of the servo motors $1a$ to $1e$, the currents and voltages of the servo amplifiers, and other time series data of physical quantities which change along with the elapse of time at the time of operation of the machine tool 1 and is linked with the time data.

The search condition setting part 12 sets a search condition of the physical quantity data which is to be displayed at the display monitor 5. That is, first, it sets the type of physical quantity (position, speed, etc.) covered by the search from the various physical quantity data which is acquired by the time series data acquisition part 11. After that, it sets the search condition for the physical quantity covered by the search. The search condition may be, for example, the local maximum value, local minimum value, maximum value, or minimum value of the physical quantity. A predetermined value of a physical quantity or a predetermined range of a physical quantity may also be set as a search condition. The search coverage and search condition may be set by operation of the input part 4. The search condition includes, in the broad sense of the term, both the search coverage and search condition.

Figure 3:
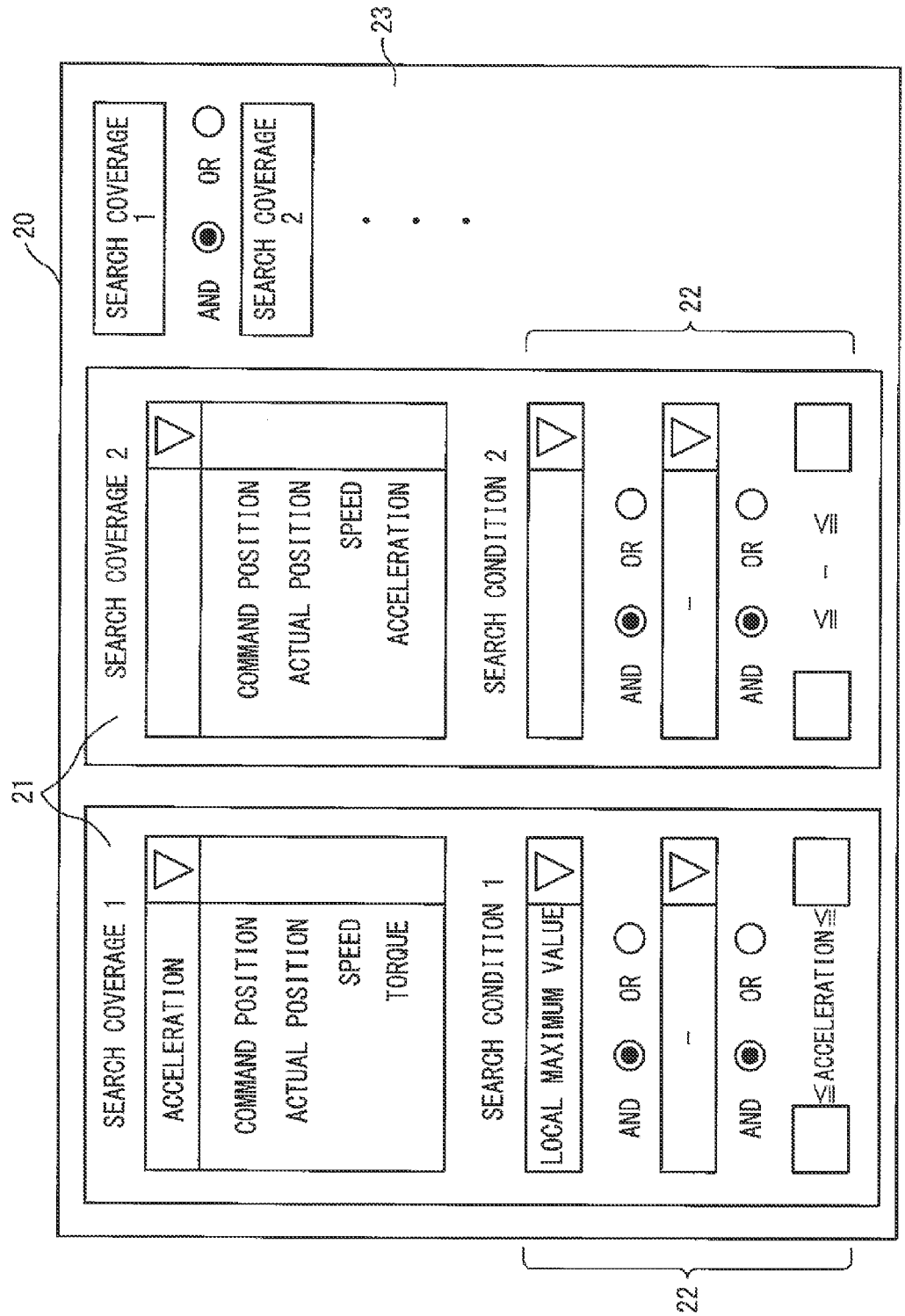
FIG. 3 is a view which shows one example of an input part of FIG. 1 constituted by an operating panel.

FIG. 3 is a view which shows one example of the input part 4 constituted by an operating panel 20. As shown in FIG. 3, the operating panel 20 has search coverage input parts 21 by which the search coverage is input and search condition input parts 22 by which search conditions are input, and is configured by a touch panel. This operating panel 20 is provided with a plurality of search coverage input parts 21. A plurality of search coverages (search coverage 1 and search coverage 2) may be selected from predetermined coverage options. Further, for each search coverage, a plurality of search condition input parts 22 are set. A plurality of search conditions (plurality of search conditions 1 and plurality of search conditions 2) can be selected from predetermined candidates of search conditions. When simultaneously selecting a plurality of search conditions or a plurality of search coverages, the "AND" on the operating panel 20 is operated, while when not simultaneously selecting them, the "OR" is operated. In FIG. 3, the acceleration is selected as the search coverage, while the local maximum value is selected as the search condition.

Further, the operating panel 20 is provided with a condition input part 23 which combines a plurality of search conditions set by the search coverage input parts 21 and search condition input parts 22 to set the final search condition. At the condition input part 23, for example, it is possible to select as the final search condition one of the following: a search condition of simultaneously satisfying the search condition 1 which is set for the search coverage 1 and the search condition 2 which is set for the search coverage 2, a search condition of satisfying at least one of the search condition 1 and search condition 2, a search condition of not satisfying either the search condition 1 and search condition 2, a search condition of satisfying the search condition 1 and not satisfying the search condition 2, and a search condition of satisfying the search condition 2 and not satisfying the search condition 1.

Figure 4:
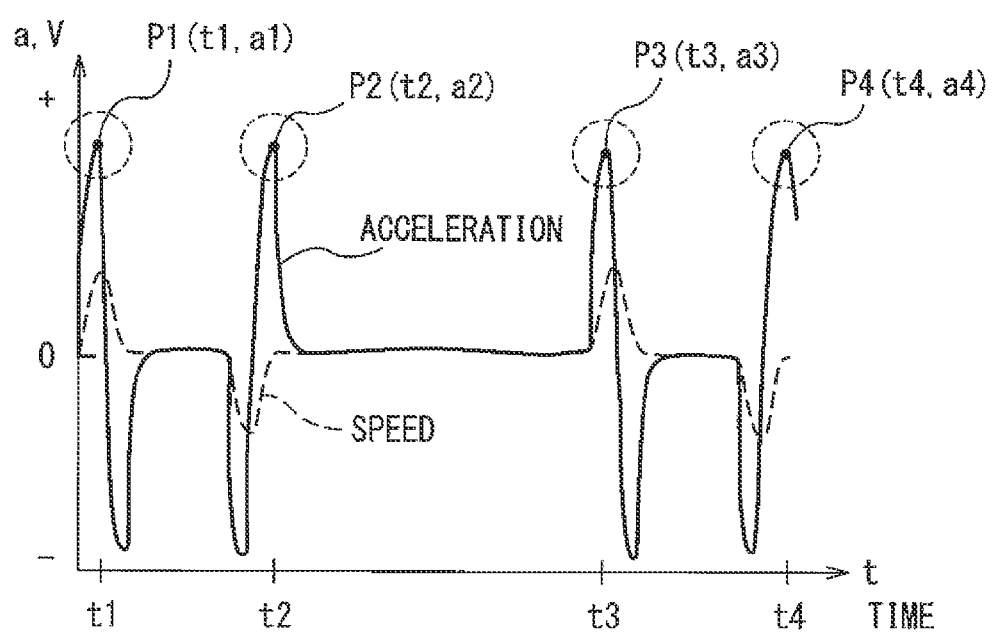
FIG. 4 is a view which shows one example of physical quantity data which is acquired by a time series data acquisition part of FIG. 1.

The data search part 13 of FIG. 1 searches for physical quantity data which satisfies the search condition set by the search condition setting part 12 (final search condition) from the physical quantity data acquired by the time series data acquisition part 11. FIG. 4 is a view which shows one example of time series data of the acceleration (solid line) and speed (broken line) acquired by the time series data acquisition part 11. For example, as shown in FIG. 3, if acceleration is selected as the search coverage and the local maximum value is selected as the search condition, the data search part 13 searches for the data (FIG. 4, P1 to P4) of the local maximum values of the acceleration from the physical quantity data and stores the time data (t1, t2, t3, and t4) corresponding to the local maximum values in the memory. The (a1, a2, a3, and a4) in the figure are local maximum value data corresponding to the time data (t1, t2, t3, and t4).

The search result display part 14 of FIG. 1 reads the time data stored by the data search part 13 and extracts the physical quantity data in a predetermined time Δt which includes the time data from the physical quantity data of the search coverage which the time series data acquisition part 11 acquired. Further, it displays the image of the extracted physical quantity data on the display monitor 5 enlarged.

Figure 5A:
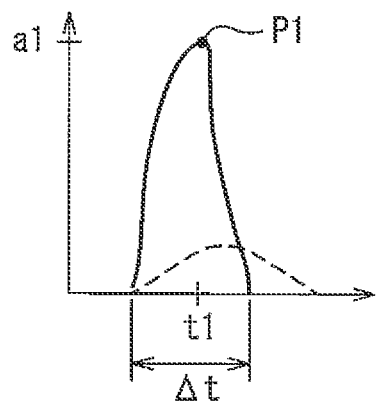
FIG. 5A is a view which shows one example of a display screen which is displayed at a search result display part of FIG. 1.
Figure 5B:
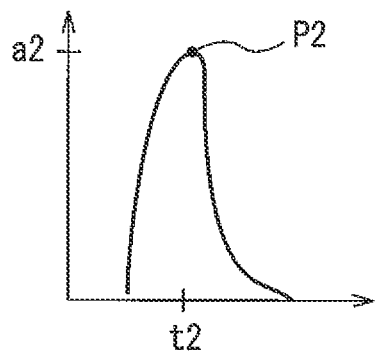
FIG. 5B is a view which shows one example of a display screen which is displayed at a search result display part of FIG. 1.
Figure 5C:
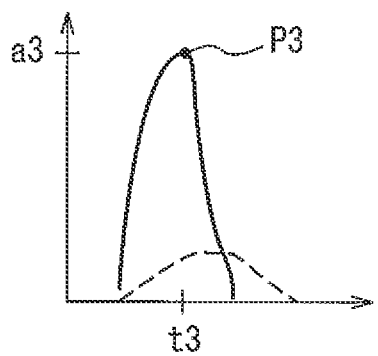
FIG. 5C is a view which shows one example of a display screen which is displayed at a search result display part of FIG. 1.
Figure 5D:
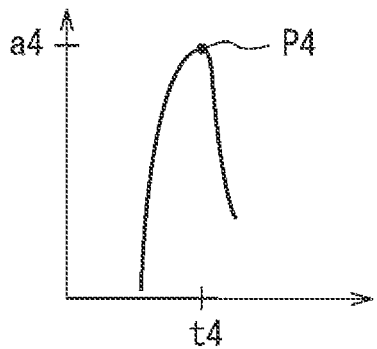
FIG. 5D is a view which shows one example of a display screen which is displayed at a search result display part of FIG. 1.

FIG. 5A to FIG. 5D are views which show examples of the display screens which are displayed by the search result display part 14. These figures are examples of the case of selecting the acceleration as the search coverage and the local maximum value as the search condition. The physical quantity data near the local maximum values P1 to P4 of FIG. 4 (broken line range of FIG. 4) is displayed enlarged. The predetermined time Δt is set centrally to the times at which the local maximum values are searched (t1, t2, t3, and t4), and before and after their times. The predetermined time Δt is able to be set through the input part 4. In FIG. 5A and FIG. 5C, the positive time series of data of the speed corresponding to the local maximum values (broken lines) are also displayed.

The search result display part 14 successively displays time series data which match the search condition, i.e., the images of FIG. 5A to FIG. 5D, on the display monitor 5. For example, after a search result display command is input from the input part 4, it consecutively displays the data every predetermined time period in the order from the one with the earliest searched time. That is, it automatically updates the display image in the order of FIG. 5A, FIG. 5B, FIG. 5C, and FIG. 5D. Rather than automatically update the display screen every predetermined time period, it is also possible to update the display image one by one every time the user inputs an image update command through the input part 4. It is also possible to use thumbnail images to display in a list the images of the physical quantity data which match the search condition. Furthermore, it is also possible for the user to select an image from the displayed list and display that selected image enlarged.

FIG. 6 is a flowchart which shows one example of the processing which is performed by the CPU of the waveform display device 10. The processing which is shown in this flowchart is, for example, started when a waveform display command is input through the input part 4.

At step S1, the search condition setting part 12 sets the type of physical quantity to be covered by the search and the search condition which that physical quantity data should satisfy. That is, it sets the search coverage (for example, acceleration) and search condition (for example, local maximum value) input by operation of the operating panel 20. When there are a plurality of search coverages, a command which is input through the condition input part 23 is used as the basis to set a pattern of combination of these plurality of search coverages.

At step S2, the data search part 13 searches for physical quantity data (for example, P1 to P4 of FIG. 4) which satisfies the search condition from the physical quantity data of the search coverage acquired by the time series data acquisition part 11. Furthermore, it searches for the time data which correspond to the physical quantity data (for example, t1, t2, t3, and t4 of FIG. 4) and stores it in the memory.

At step S3, the search result display part 14 reads the time data stored at the data search part 13. Further, it extracts the time series of physical quantity data near that time data, i.e., the waveform data in a predetermined time Δt which includes the time data, from the physical quantity data acquired by the time series data acquisition part 11, and displays it on the display monitor 5. In this case, for example, as shown in FIG. 5A to FIG. 5D, when the extracted waveform data is a plurality of data, it displays the plurality of waveform data consecutively.

Figure 7:
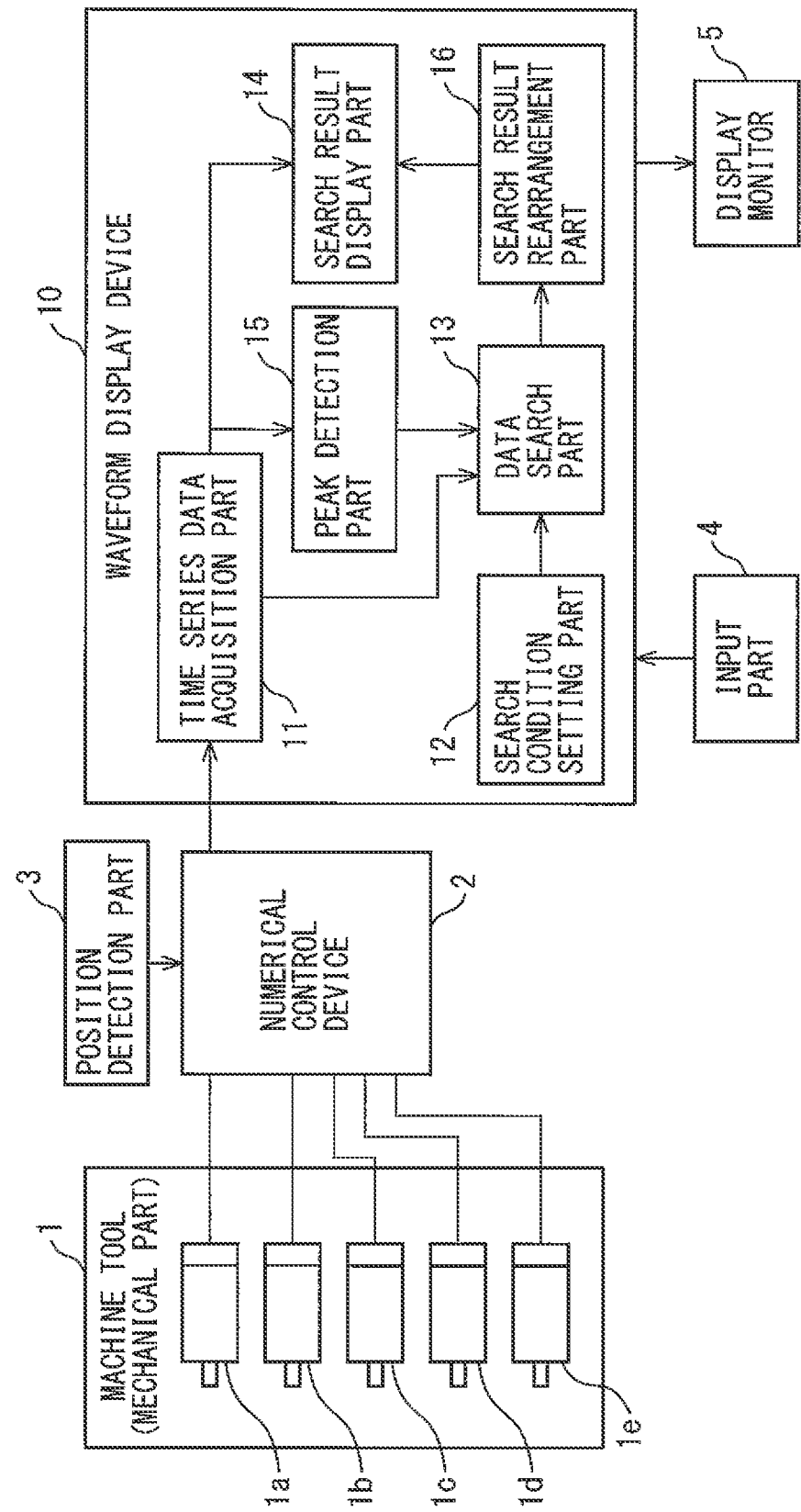
FIG. 7 is a block diagram which shows a modification of FIG. 1.

Above, the data search part 13 searched for physical quantity data matching the search condition from the physical quantity data acquired by the time series data acquisition part 11. However, for example, it is also possible to detect the local maximum value or local minimum value or other peak values by a peak detection part. FIG. 7 is a block diagram which shows on example of a waveform display device 10 which has a peak detection part.

In FIG. 7, the waveform display device 10 is further provided with a peak detection part 15 and a search result rearrangement part 16. The physical quantity data acquired by the time series data acquisition part 11 is read into the peak detection part 15. The peak detection part 15 stores the time when the ratio of increase of the time series of the physical quantity data changes from positive to negative and the time when it changes from negative to positive as the peak time in the memory. When the local maximum value or the local minimum value is set as the search condition, the data search part 13 reads the peak time which satisfies that search condition, detected by the peak detection part 15, and searches for and reads the physical quantity data at that peak time from the physical quantity data acquired by the time series data acquisition part 11.

The search result rearrangement part 16 compares the magnitude of the values of the physical quantity data searched by the data search part 13 and, in accordance with the results of the comparison, rearranges the combination of the physical quantity data and the time data in a predetermined order. For example, it rearranges the data in the order of the larger physical quantities (ascending order) or the smaller ones (descending order). The condition of rearrangement can be set by the user in advance through the input part 4. The search result display part 14 successively displays the waveform data in a predetermined time Δt which includes the respective physical quantity data in the order of the data rearranged by the search result rearrangement part 16.

Figure 8:
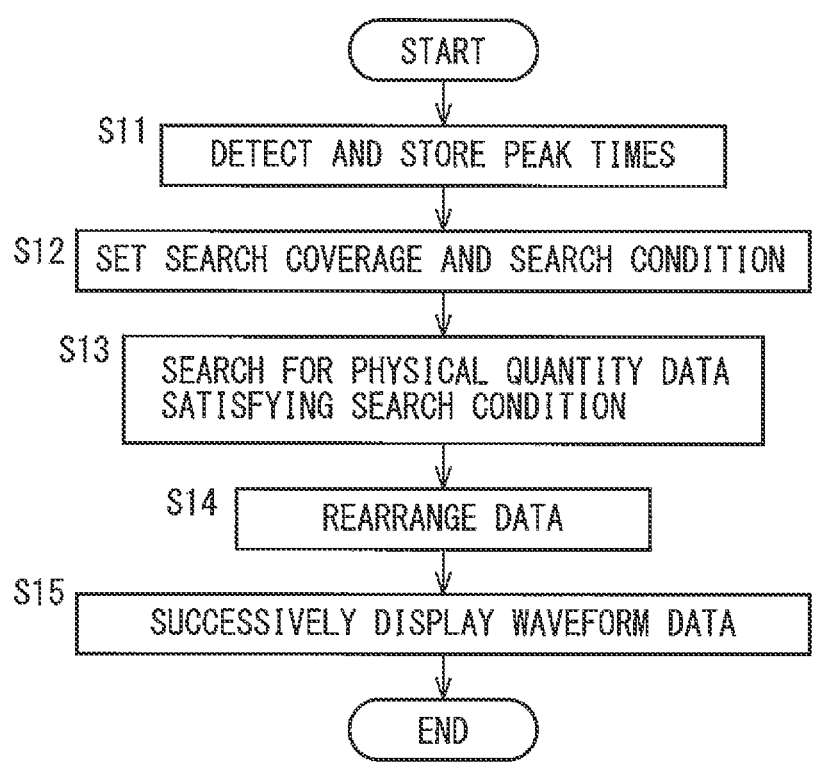
FIG. 8 is a flowchart which shows one example of processing which is performed by the waveform display device of FIG. 7.
Figure 9A:
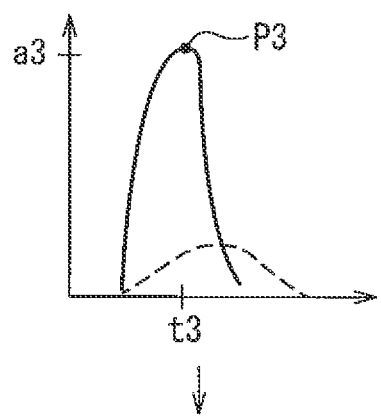
FIG. 9A is a view which shows one example of a display screen which is displayed by the search result display part of FIG. 7.
Figure 9B:
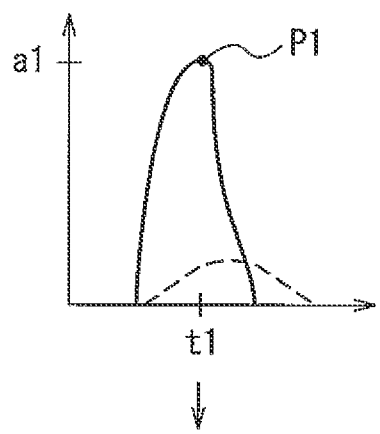
FIG. 9B is a view which shows one example of a display screen which is displayed by the search result display part of FIG. 7.
Figure 9C:
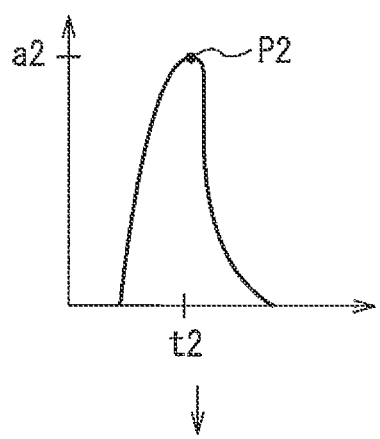
FIG. 9C is a view which shows one example of a display screen which is displayed by the search result display part of FIG. 7.
Figure 9D:
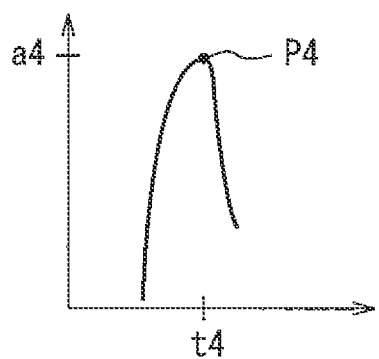
FIG. 9D is a view which shows one example of a display screen which is displayed by the search result display part of FIG. 7.

FIG. 8 is a flowchart which shows one example of the processing which is performed by the waveform display device 10 of FIG. 7. The processing which is shown in this flowchart is started, for example, when a waveform display command is input through the input part 4, like in FIG. 6.

At step S11, the peak detection part 15 searches for the times when the ratio of increase of the physical quantity data changes from positive to negative (for example, FIG. 4, t1, t2, t3, and t4) and the times when it changes from negative to positive, and stores the time data in the memory. At step S12, in the same way as step S1 of FIG. 6, the search coverage and search condition are set. At step S13, in the same way as step S2 of FIG. 6, the physical quantity data which satisfies the search condition (for example, the local maximum value) is searched for and the time data corresponding to that physical quantity data (t1, t2, t3, and t4) is stored in the memory.

At step S14, the search result rearrangement part 16 rearranges the physical quantity data searched by the data search part 13 in accordance with the rearrangement conditions set through the input part 4. For example, it is assumed that the peak values P1 to P4 of FIG. 4 are searched by the data search part 13 and the peak values have sizes of a relative magnitude of a3>a1>a2>a4. At this time, if the descending order is set as the condition for rearrangement of the data, the search result rearrangement part 16 rearranges the time data t1 to t4 which is stored in the data search part 13 in the order of t3, t1, t2, and t4.

At step S15, the search result display part 14 successively displays on the display monitor 5 the waveform data in the predetermined time Δt which includes the respective physical quantity data, in the order of the data rearranged by the search result rearrangement part 16. FIG. 9A to FIG. 9D are views which show examples of the order of display of the images which are displayed on the display monitor 5. Here, it is assumed that the time data t1 to t4 have been rearranged as explained above in the order of t3, t1, t2, and t4. In this case, images of waveform data which correspond to the time data t1 to t4 are successively displayed in the order of FIG. 9A, FIG. 9B, FIG. 9C, and FIG. 9D.

According to the present embodiment, the following such actions and effects can be exhibited.

(1) The waveform display device 10 is provided with a time series data acquisition part 11 which acquires a time series of physical quantity data, a search condition setting part 12 which sets a search condition of the physical quantity data, a data search part 13 which searches for physical quantity data which satisfies the search condition, and a search result display part 14 which displays by a waveform the time series of physical quantity data in a predetermined time Δt which includes the searched physical quantity data (FIG. 1).

Due to this, a user can easily obtain a grasp of the state under predetermined conditions of a desired physical quantity and can discover early any abnormality at the time of operation of the machine tool 1. That is, by a user just setting the search coverage and search condition, the waveform display device 10 automatically searches for and displays the time series of physical quantity data which matches the search coverage and search condition. Therefore, a user can easily obtain the desired waveform data from all of the physical quantity data acquired by the time series data acquisition part 11.

(2) The operating panel 20 can be operated to simultaneously set a plurality of search coverages and a plurality of search conditions and enable the data search part 13 to search for physical quantity data which simultaneously satisfies the plurality of search conditions, so a user can easily grasp the desired waveform data combining a plurality of search conditions. For example, it is possible to set different search conditions for the plurality of waveform data which differ in search coverage simultaneously measured, and display the waveform data where these overlap, and therefore possible to efficiently obtain the waveform data.

(3) When providing a peak detection part 15 which detects the peak time when a ratio of increase of the value of physical quantity data changes from positive to negative or from negative to positive (FIG. 7), searching for the peak value of the physical quantity data becomes easy.

(4) When providing a search result rearrangement part 16 which rearranges the plurality of physical quantity data in accordance with the magnitude of the value of the physical quantity data (FIG. 7), a user can successively confirm data from data with the highest (or lowest) importance or data the closest (or farthest) from a predetermined limit value and can efficiently confirm data.

MODIFICATIONS

In the above embodiment, the time series data acquisition part 11 read the physical quantity data (position, speed, etc.) from the numerical control device 2 to acquire the physical quantity data. However, it may also perform predetermined processing on the physical quantity data read from the numerical control device 2 to acquire the physical quantity data. For example, it is possible to read position data from the numerical control device 2 and use that position data as the basis to calculate the speed or acceleration, and thereby enable the time series data acquisition part 11 to acquire the speed data or acceleration data. Below, the example of acquiring speed data of the tip point of the tool 102 will be explained.

Figure 10:
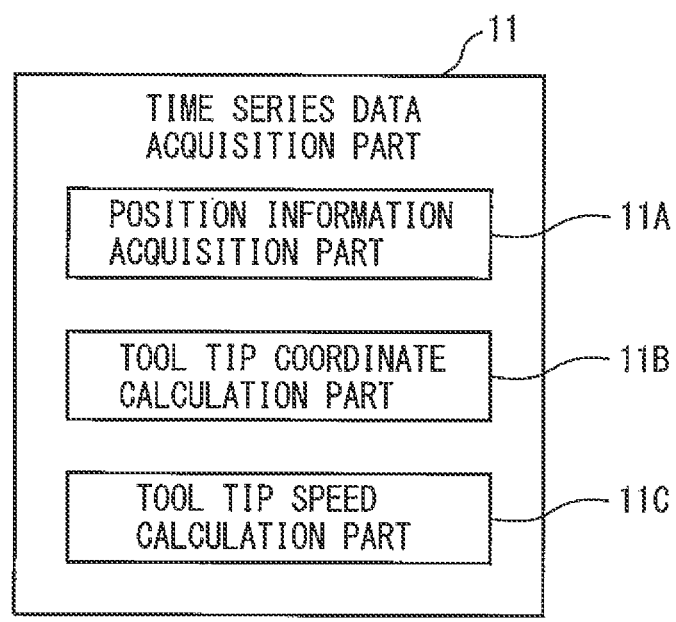
FIG. 10 is a view which shows a modification of the time series data acquisition part of FIG. 1.

FIG. 10 is a block diagram which shows the internal configuration of a time series data acquisition part 11. As shown in FIG. 10, the time series data acquisition part 11 has a position information acquisition part 11A which acquires position information of the machine tool 1 from the numerical control device 2, a tool tip coordinate calculation part 11B which calculates the coordinates of the tip point of the tool 102, and a tool tip speed calculation part 11C which calculates the speed of the tip point of the tool 102.

The position information acquisition part 11A acquires the position commands of the linear feed shaft and rotary feed shaft of the machine tool 1 and the actual positions of the different drive axes when driving the feed axes in accordance with the position commands.

The tool tip coordinate calculation part 11B calculates the coordinates of the tool tip point from these position information and the information on the mechanical design of the machine tool 1. For example, the intersection of the center axis of rotation of the axis A of FIG. 2 and the center axis of rotation of the axis B is defined as "M", the 3D coordinates of the point M at the time "t" are defined as (Mx(t), My(t), Mz(t)), and the coordinates of the axis A and the axis B are defined as a(t) and b(t). At this time, if defining the length from the point M to the tool tip point as "L" and the state where the tool 102 faces directly downward as the reference positions (origins) of the A-axis and B-axis, the tool tip coordinate calculation part 11B calculates the coordinates (X(t), Y(t), and Z(t)) of the tool tip point by the following formula (I):

$$Xt = Mx(t) + L \times \cos(a(t)) \times \sin(b(t))$$

$$Yt = My(t) + L \times \sin(a(t))$$

$$Zt = Mz(t) - L \times \cos(a(t)) \times \cos(b(t)) \tag{I}$$

The tool tip point speed calculation part 11C differentiates the calculated coordinates of the tool tip point by time so as to calculate the X-, Y-, and Z-components of speed of the tool tip point. Further, it combines the components in a vector manner to calculate the speed (composite speed) of the tool tip point. That is, it uses the position data of the tool tip part as the basis to calculate the time series of speed data at the tool tip part.

Figure 11:
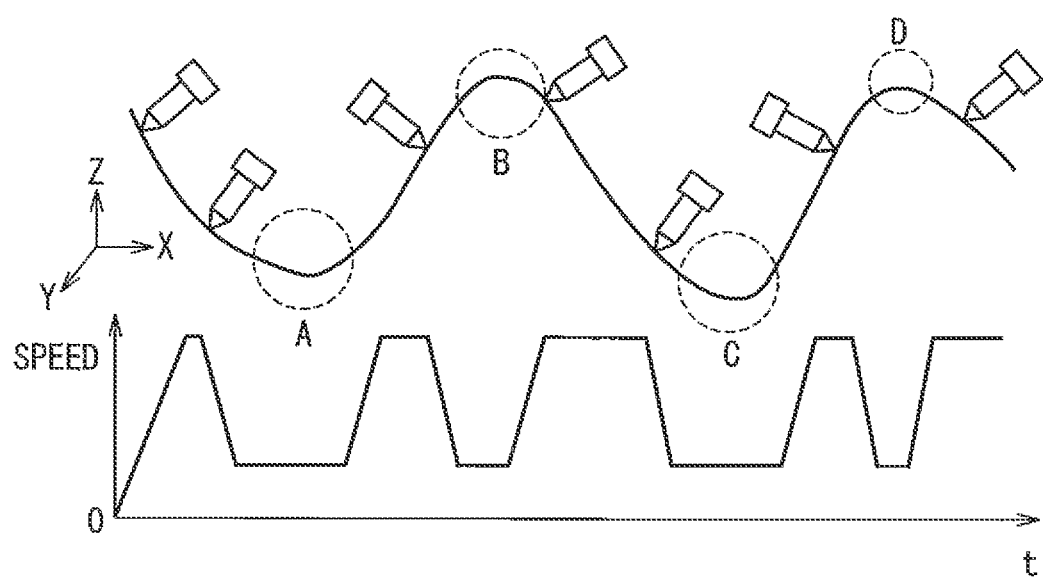
FIG. 11 is a view which shows one example of time series data of a position and speed of a tool tip point which are acquired by the time series data acquisition part of FIG. 10.

FIG. 11 is a view which shows one example of time series data of the position and speed of a tool tip point which are calculated by the time series data acquisition part 11 of FIG. 10. As shown in FIG. 11, the curved parts A to D (broken line parts) of the movement path of the tool tip point fluctuate in acceleration more easily than the straight parts and are more susceptible to shape error. For this reason, the numerical control device 2 controls the drive operation of the feed axes so as to lower the speed at the curved parts A to D. Therefore, for example, by selecting the speed of the tool tip point as the search coverage and the local minimum value as the search condition, the data search part 13 can extract speed data of the curved parts A to D where shape error easily occurs from the speed data calculated by the tool tip speed calculation part 11C.

Figure 12:
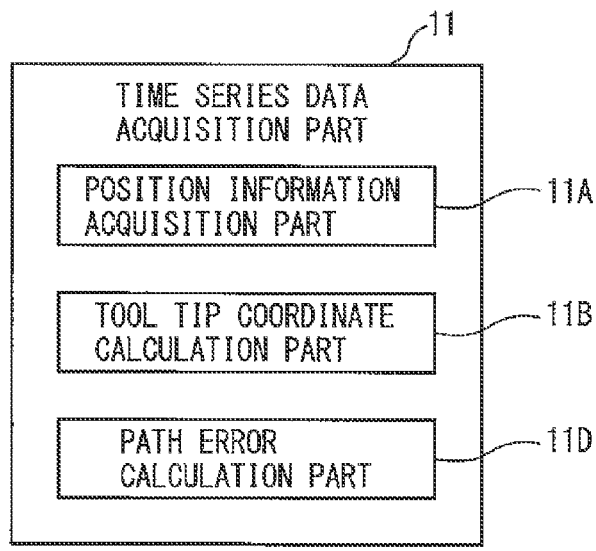
FIG. 12 is a view which shows another modification of the time series data acquisition part of FIG. 1.

FIG. 12 is a view which shows another example of time series data acquisition part 11. The time series data acquisition part 11 of FIG. 12 has a path error calculation part 11D instead of the tool tip speed calculation part 11C. The path error calculation part 11D calculates the error between the movement path based on the command value of the tool tip point calculated by the tool tip coordinate calculation part 11B (command movement path) and the movement path based on the measured value (actual movement path), i.e., the shortest distance from the actual movement path to the command movement path at each time. That is, it uses the position data between the command value and measured value of the tool tip part as the basis to calculate the error data between the command value and measured value of the movement path of the tool tip part.

Figure 13:
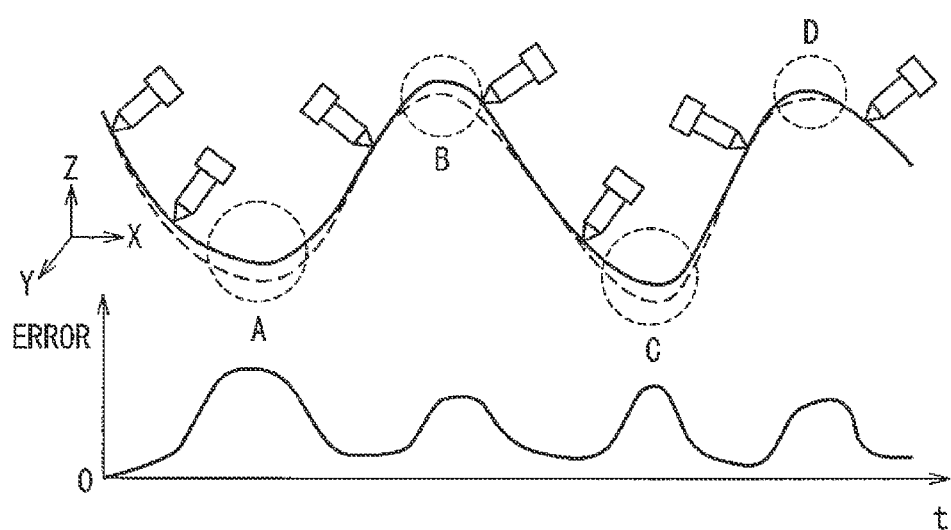
FIG. 13 is a view which shows one example of a movement path of the tool tip point and error data which are acquired by the time series data acquisition part of FIG. 12.

FIG. 13 is a view which shows one example of the movement path of the tool tip point and error data which are calculated by the time series data acquisition part 11 of FIG. 12. In the figure, the solid line movement path shows the actual movement path, while the broken line movement path shows the command path. As shown in FIG. 13, the error of the movement path becomes greater at the curved parts A to D. Therefore, for example, by selecting the error of the movement path as the search coverage and the maximum value as the search condition, the data search part 13 can extract the error data of the curved parts A to D where error will become a problem from the error data calculated by the path error calculation part 11D. Further, it can extract the curved parts A to D as locations corresponding to the extracted error data. By displaying this error data or the curved parts A to D corresponding to the error data on the display monitor 5, the user can obtain a grasp of the magnitude of the error and the timing at which the error occurs, and can easily adjust the servo control (adjust the gain, etc.) so that the error becomes smaller.

In the above embodiment (FIG. 1), although the waveform display device is designed to display the data searched by the data search part 13 on the display unit monitor 5, the searched physical quantity data and the displayed physical quantity data may also differ. For example, it is also possible to search for a point of time of a large path error and display the positions or speeds of the axes of the machine tool 1 at that point of time as other physical quantity data corresponding to the searched physical quantity data. That is, the search result display part 14 can be configured in any way so long as it extracts a time series of physical quantity data in a predetermined range which includes first physical quantity data (for example, error data) searched by the data search part 13 or second physical quantity data (for example, speed data) which corresponds to the first physical quantity data (for example, of the same point of time as the first physical quantity data), from the physical quantity data acquired by the time series data acquisition part 11, and displays the extracted physical quantity data by a waveform. In the above embodiment, although the case where the data search part 13 searched for a plurality of physical quantity data which satisfied the search conditions is explained, the physical quantity data which is searched for may also be a single data. The waveform display device of the present invention includes this case. In the above embodiment, as the machine tool 1, a five-axis vertical machining center is used. However, the present invention can be similarly applied to another machine tool which has a servo motor which is controlled by a numerical control device 2 as well. Although the search condition setting part 12 set the search coverage and the search conditions, it is also possible to fix the search coverage and set only the search conditions.

The above embodiment may be combined with one or more of the above modifications.

According to the present invention, the waveform display device sets a search condition for physical quantity data, searches for physical quantity data which satisfies this search condition, and displays by a waveform a time series of physical quantity data which includes the searched physical quantity data or other physical quantity data corresponding to this physical quantity data, so it is possible to easily obtain desired waveform data which matches a search condition and possible to obtain a grasp of the relationship between waveform data which corresponds to an abnormal region and other waveform data in a time region which corresponds to an abnormal region.

Above, the present invention was explained in relation to preferred embodiments, but a person skilled in the art would understand that various corrections and changes may be made without departing from the scope of disclosure of the later set forth claims.

The invention claimed is:

1. A machine tool, comprising:
a numerical control device;
a servo motor controlled by the numerical control device; and
a waveform display device displaying, by a waveform, a time series of physical quantity data changing with time in the machine tool,
the waveform display device comprising:
    a time series data acquisition part coupled to the numerical control device of the machine tool, and acquiring the time series of physical quantity data from the numerical control device;
    a search condition setting part setting a search condition of the physical quantity data;
    a data search part searching for physical quantity data satisfying the search condition set by the search condition setting part, from among the physical quantity data acquired by the time series data acquisition part; and
    a search result display part extracting a time series of physical quantity data in a predetermined range including the physical quantity data searched by the data search part or other physical quantity data corresponding to the physical quantity data searched by the data search part, from among the physical quantity data acquired by the time series data acquisition part, and displaying the extracted time series of physical quantity data by a waveform,
    wherein, when a plurality of the physical quantity data satisfying the search condition are searched by the data search part, the search result display part successively displays by waveforms a plurality of time series of physical quantity data in a predetermined range including the respective searched physical quantity data or other physical quantity data corresponding to the respective searched physical quantity data, to enable monitoring of an operation state of the machine tool.

2. The machine tool according to claim 1, wherein
the search condition setting part is configured to set a plurality of search conditions, and
the data search part searches for physical quantity data simultaneously satisfying the plurality of search conditions set by the search condition setting part.

3. The machine tool according to claim 1, wherein
the waveform display device further comprises a peak detection part detecting a peak time at which a ratio of increase of a value of the physical quantity data changes from positive to negative or from negative to positive, from among the physical quantity data acquired by the time series data acquisition part, and
the data search part searches for physical quantity data corresponding to the peak time detected by the peak detection part, from among the physical quantity data acquired by the time series data acquisition part.

4. The machine tool according to claim 1, wherein
the waveform display device further comprises a search result rearrangement part,
when a plurality of physical quantity data satisfying the search condition are searched by the data search part, the search result rearrangement part rearranges the plurality of physical quantity data in accordance with magnitudes of values of the plurality of physical quantity data, and
the search result display part displays by a waveform a plurality of time series of physical quantity data in a predetermined range including the respective physical quantity data, in an order rearranged by the search result rearrangement part.

5. The machine tool according to claim 1, further comprising a tool, wherein
the time series data acquisition part has a tool tip speed calculation part calculating a time series of speed data at a tip part of the tool provided at the machine tool, based on position data at the tip part of the tool, and
the data search part searches for speed data satisfying the search condition set by the search condition setting part, from among the speed data calculated by the tool tip speed calculation part.

6. The machine tool according to claim 1, further comprising a tool, wherein
the time series data acquisition part has a path error calculation part calculating error data between a command value and measured value of a movement path of a tip part of the tool provided at the machine tool, based on position data between a command value and measured value at the tip part of the tool, and
the data search part searches for error data satisfying the search condition set by the search condition setting part, from among the error data calculated by the path error calculation part.

* * * * *